(12) United States Patent
Park

(10) Patent No.: US 11,360,900 B2
(45) Date of Patent: *Jun. 14, 2022

(54) STORAGE DEVICE AND METHOD OF OPERATING THE SAME

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/022,178

(22) Filed: Sep. 16, 2020

(65) Prior Publication Data

US 2020/0409854 A1    Dec. 31, 2020

Related U.S. Application Data

(63) Continuation of application No. 16/225,141, filed on Dec. 19, 2018, now Pat. No. 10,802,976.

(30) Foreign Application Priority Data

Apr. 24, 2018 (KR) .................. 10-2018-0047375

(51) Int. Cl.
| | | |
|---|---|---|
| G06F 12/0871 | (2016.01) | |
| G06F 12/02 | (2006.01) | |
| G06F 12/0888 | (2016.01) | |
| G06F 3/06 | (2006.01) | |
| G06F 11/07 | (2006.01) | |
| G06F 11/30 | (2006.01) | |

(52) U.S. Cl.
CPC .......... *G06F 12/0871* (2013.01); *G06F 3/064* (2013.01); *G06F 3/0688* (2013.01); *G06F 11/073* (2013.01); *G06F 11/3058* (2013.01); *G06F 12/0253* (2013.01); *G06F 12/0888* (2013.01); *G06F 3/067* (2013.01); *G06F 2201/81* (2013.01); *G06F 2201/885* (2013.01); *G06F 2212/7201* (2013.01); *G06F 2212/7205* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 8,812,777 | B2 * | 8/2014 | Cha | ........................ G11C 16/06 |
| | | | | 711/103 |
| 2015/0324284 | A1 * | 11/2015 | Kim | .................... G06F 12/0246 |
| | | | | 711/103 |

* cited by examiner

*Primary Examiner* — Brian R Peugh
(74) *Attorney, Agent, or Firm* — IP & T Group LLP

(57) ABSTRACT

Provided herein may be a storage device configured to perform a cache read operation by each memory device. The storage device may include a plurality of memory devices each including a plurality of memory blocks, and a memory controller configured to store and set cache setting information for each of the plurality of memory device, and control the plurality of memory devices such that, as a read operation on a select one of the plurality of memory devices, one of a cache read operation and a normal read operation is performed based on the cache setting information set for of the select memory device.

17 Claims, 13 Drawing Sheets

| CHIP # | CACHE READ |
|---|---|
| CHIP 1 | ENABLED |
| CHIP 2 | DISABLED |
| CHIP 3 | ENABLED |
| CHIP 4 | ENABLED |
| CHIP 5 | DISABLED |
| CHIP 6 | DISABLED |
| ⋮ | ⋮ |
| CHIP k | ENABLED |

212

STORAGE DEVICE AND METHOD OF OPERATING THE SAME

CROSS-REFERENCE TO RELATED APPLICATION

This application is a continuation of U.S. patent application Ser. No. 16/225,141 filed on Dec. 19, 2018, now U.S. Pat. No. 10,802,976, which claims benefits of priority of Korean patent application number 10-2018-0047375, filed on Apr. 24, 2018. The disclosure of each of the foregoing application is incorporated herein by reference in its entirety.

BACKGROUND

Field of Invention

Various embodiments of the present disclosure generally relate to an electronic device, and more particularly, to a storage device and a method of operating the storage device.

Description of Related Art

Generally, a storage device stores data under control of a host device such as a computer, a smartphone, or a smartpad. A storage device may be a hard disk drive (HDD) which stores data in a magnetic disk, a solid state drive (SSD), or a memory card which stores data in a semiconductor memory, particularly, a nonvolatile memory.

The storage device may include a memory device in which data is stored, and a memory controller configured to store data in the memory device. The memory device may be a volatile memory or a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), and the like.

SUMMARY

Various embodiments of the present disclosure are directed to a storage device configured to perform a cache read operation by each memory device, and a method of operating the storage device.

An embodiment of the present disclosure may provide for a storage device including: a plurality of memory devices each including a plurality of memory blocks; and a memory controller configured to store and set cache setting information for each of the plurality of memory device, and control the plurality of memory devices such that, as a read operation on a select one of the plurality of memory devices, one of a cache read operation and a normal read operation is performed based on the cache setting information set for of the select memory device.

An embodiment of the present disclosure may provide for a method of operating a memory controller configured to control a plurality of memory devices each including a plurality of memory blocks, the method including: setting cache setting information indicating whether a cache read operation is to be performed on each of the plurality of memory devices; and performing one of a cache read operation and a normal read operation on a select one of the plurality of memory devices based on the cache setting information.

An embodiment of the present disclosure may provide for a storage device including: a plurality of memory devices, each including a plurality of memory blocks; and a memory controller configured to: generate first information regarding a number of the plurality of memory devices and second information regarding victim blocks for a garbage collection operation in the plurality of memory devices; and control the plurality of memory devices to perform one of a cache read operation and a normal read operation based on at least one of the first and second information.

DETAILED DESCRIPTION

Figure 1:
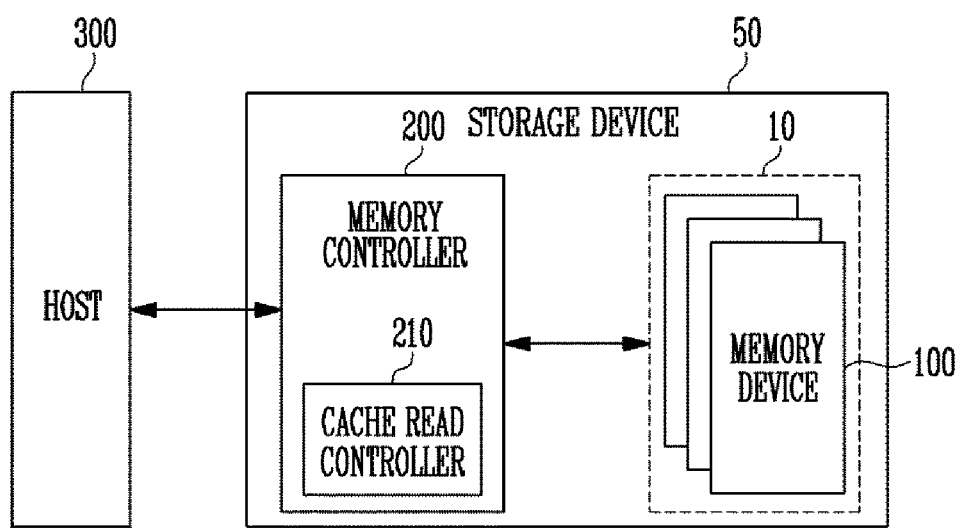
FIG. 1 is a block diagram illustrating a storage device in accordance with an embodiment of the present disclosure.

Various embodiments will now be described more fully with reference to the accompanying drawings; however, elements and features of the present invention may be configured or arranged differently than illustrated and described herein. Thus, the present invention in not limited to the embodiments set forth herein. Rather, these embodiments are provided so that this disclosure is thorough and complete and fully conveys the scope of the embodiments to those skilled in the art. Also, throughout the specification, reference to "an embodiment," or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present.

Embodiments are described herein with reference to schematic and sectional illustrations of systems, devices, and intermediate structures, i.e., elements. As such, variations from the shapes of the illustrations as a result, for example, of manufacturing techniques and/or tolerances, are to be expected. Thus, embodiments should not be construed as limited to the particular shapes of elements or their regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to identify various components, but they should not limit the various components. Those terms are only used for the purpose of differentiating a component from other components that have the same or similar names. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from and vice versa, unless the context indicates otherwise. Furthermore, "include/comprise" or "including/comprising" used in the specification represents that one or more components, steps, operations, and elements exist or are added but does not preclude the existence or addition of one or more other components, steps, operations, and/or elements.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through one or more intermediate components. On the other hand, "directly connected/directly coupled" refers to one component directly coupling another component without an intermediate component.

FIG. 1 is a block diagram illustrating a storage device 50 in accordance with an embodiment of the present disclosure.

Referring to FIG. 1, the storage device 50 may include a memory device group 10 and a memory controller 200. The memory device group 10 may include a plurality of memory devices 100.

The storage device 50 may be configured to store data under control of a host 300 such as a cellular phone, a smartphone, an MP3 player, a laptop computer, a desktop computer, a game machine, a television (TV), a tablet personal computer (PC), or an in-vehicle infotainment system.

The storage device 50 may be configured as any one of various kinds of storage devices depending on a host interface, which is a communication system with the host 300. For example, the storage device 50 may be configured as a solid state drive (SSD), multimedia card (MMC), embedded MMC (eMMC), reduced size MMC (RS-MMC), or micro-MMC type multimedia card, a secure digital (SD), mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) type storage device, a compact flash (CF) card, a smart media card, and/or a memory stick.

The storage device 50 may be manufactured in any one of various package types. For instance, the storage device 50 may be manufactured as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

Each of the memory devices 100 may store data therein. It is noted that the reference numeral 100 is used to identify any one memory device or plural memory devices. The memory device 100 may operate under control of the memory controller 200. The memory device 100 may include a memory cell array including a plurality of memory cells configured to store data therein. The memory cell array may include a plurality of memory blocks. Each memory block may include a plurality of memory cells. Each memory block may include a plurality of pages. In an embodiment, each page may be the unit of storing data in the memory device 100 or reading stored data from the memory device 100. The memory block may be the unit of erasing data.

A memory block may be a free block or a data block depending on whether data is stored therein.

The free block may be an empty block in which no data is stored. The data block may be a block in which data is stored. The data stored in the data block may be divided into valid data and invalid data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM or ReRAM), a phase-change random access memory (PRAM), a magnetoresistive random access memory (MRAM), a ferroelectric random access memory (FRAM), or a spin transfer torque random access memory (STT-RAM). In this specification, by way of example, it is assumed that the memory device 100 is a NAND flash memory.

In an embodiment, the memory device 100 may be embodied in a three-dimensional (3D) array structure. The present disclosure may be applied not only to a flash memory in which a charge storage layer is formed of a conductive floating gate (FG), but also to a charge trap flash (CTF) memory in which a charge storage layer is formed of an insulating layer.

The memory device 100 may receive a command and an address from the memory controller 200 and access a region of the memory cell array that is selected by the address. In other words, the memory device 100 may perform an operation corresponding to the command on the region selected by the address. For example, the memory device 100 may perform a write (or program) operation, a read operation, and an erase operation. During a program operation, the memory device 100 may program data to a region selected by an address. During a read operation, the memory device 100 may read data from a region selected by an address. During an erase operation, the memory device 100 may erase data from a region selected by an address.

In an embodiment, the read operation that is performed by the memory device 100 may be a normal read operation or a cache read operation.

During a normal read operation, the memory device 100 may receive a normal read command and an address from the memory controller 200. The memory device 100 may read data stored in a region selected by the address, and store the read data in a page buffer in the memory device 100. Subsequently, in response to a data output command inputted or received from the memory controller 200, the read data stored in the page buffer may be outputted.

During a cache read operation, the memory device 100 may receive a cache read command and an address from the memory controller 200. The address provided to the memory device 100 during the cache read operation may correspond to a plurality of pages. Alternatively, the address provided to the memory device 100 during the cache read operation may be a sequential address which sequentially increases or decreases. In response to the cache read command, the memory device 100 may read, on a page basis, data corresponding to a plurality of pages requested according to cache read.

The cache read operation may be an operation of reading data of one page in the memory device 100 and storing the data in the page buffer; reading data of another page of the memory device 100 while the stored data of the one page is outputted to the memory controller 200; and storing the data of the another page in the page buffer.

The memory controller 200 may control the operation of the memory device 100 in response to a request of the host 300 or in the absence of a request of the host 300.

For example, the memory controller 200 may control the memory device 100 to perform a program operation, a read operation, or an erase operation in response to a request from the host 300. During the program operation, the memory controller 200 may provide a program command, a physical address, and data to the memory device 100. During the read operation, the memory controller 200 may provide a read command and a physical address to the memory device 100. During the erase operation, the memory controller 200 may provide an erase command and a physical address to the memory device 100.

In an embodiment, the memory controller 200 may autonomously generate a program command, an address and data without a request from the host 300, and transmit them to the memory device 100. For example, the memory controller 200 may provide a command, an address and data to the memory device 100 so as to perform a program operation for wear leveling, or a program operation for garbage collection.

The memory controller 200 may execute firmware (FW) for controlling the memory device 100. In the case where the memory device 100 is a flash memory device, the memory controller 200 may manage firmware such as a flash translation layer (FTL) for controlling communication between the host 300 and the memory device 100. In detail, the memory controller 200 may translate a logical address included in a request from the host 300 into a physical address.

The memory controller 200 may include a cache read controller 210.

The cache read controller 210 may control a cache read operation for the memory device 100.

If power is supplied, the cache read controller 210 may set cache setting information for the memory devices 100 to be controlled by the memory controller 200.

In detail, if power is supplied, the memory controller 200 may drive the firmware.

The memory controller 200 may load system environment information. The system environment information may include information about the number of memory devices 100 to be controlled by the memory controller 200.

The cache read controller 210 may set cache setting information of the memory devices 100 to be controlled by the memory controller 200 based on the system environment information.

According to the cache setting information, the memory controller 200 may determine a command corresponding to a read operation to be performed by a corresponding memory device 100. For example, the memory controller 200 may control the memory devices 100 such that a read operation to be performed by a memory device 100 of which the cache setting information indicates an enabled state is performed as a cache read operation. Alternatively, the memory controller 200 may control the memory devices 100 such that a read operation to be performed by a memory device 100 of which the cache setting information indicates a disabled state is performed as a normal read operation.

In an embodiment, the cache read controller 210 may set cache setting information for each of the memory devices 100 to be controlled by the memory controller 200. In detail, depending on whether a garbage collection operation is performed on memory blocks in a memory device 100, the memory controller 200 may set cache setting information of the corresponding memory device 100.

The garbage collection operation may be performed when the number of free blocks is reduced to less than a reference number or value. In detail, the garbage collection operation may be an operation of: selecting a victim block from among data blocks; reading valid data stored in the victim block and storing the valid data in a new free block; and obtaining a free block by erasing the victim block.

In various embodiments, the cache read controller 210 may set cache setting information of a memory device 100 based on a pattern of a read request received from the host 300. For example, if random read requests for a specific memory device 100 are repeatedly received, the cache setting information of the corresponding memory device 100 may be set to a disabled state. Alternatively, if sequential read requests for a specific memory device 100 are repeatedly received, the cache setting information of the corresponding memory device 100 may be set to an enabled state.

During a read operation on a memory device 100 of which the cache setting information indicates the enabled state, the memory controller 200 may perform the read operation as a cache read operation. For this, the memory controller 200 may provide a cache read command to the memory device 100.

Alternatively, during a read operation on a memory device 100 of which the cache setting information indicates the disabled state, the memory controller 200 may perform the read operation as a normal read operation. For this, the memory controller 200 may provide a normal read command to the memory device 100.

The memory controller 200 may include a buffer memory (not shown). In an embodiment, the memory controller 200 may control data exchange between the host 300 and the buffer memory. Alternatively, the memory controller 200 may temporarily store system data for controlling the memory device 100 to the buffer memory. For example, the memory controller 200 may temporarily store, to the buffer memory, data received from the host 300, and thereafter transmit the data temporarily stored in the buffer memory to the memory device 100.

In various embodiments, the buffer memory may be used as an operating memory or a cache memory of the memory controller 200. The buffer memory may store codes or commands to be executed by the memory controller 200. Alternatively, the buffer memory may store data to be processed by the memory controller 200. Furthermore, the buffer memory may store a logical-to-physical address mapping table indicating mapping relationship between logical addresses and physical addresses. In an embodiment, the buffer memory may be implemented with a static random access memory (SRAM) or a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or a Rambus dynamic random access memory (RDRAM). In various embodiments, the buffer memory may be included in the storage device 50 as an independent DRAM or SRAM, rather than being included within the memory controller 200.

In an embodiment, the memory controller 200 may control at least two memory devices 100. In this case, the memory controller 200 may control the memory devices 100 in an interleaving manner so as to enhance the operating performance.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe or PCI-e), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
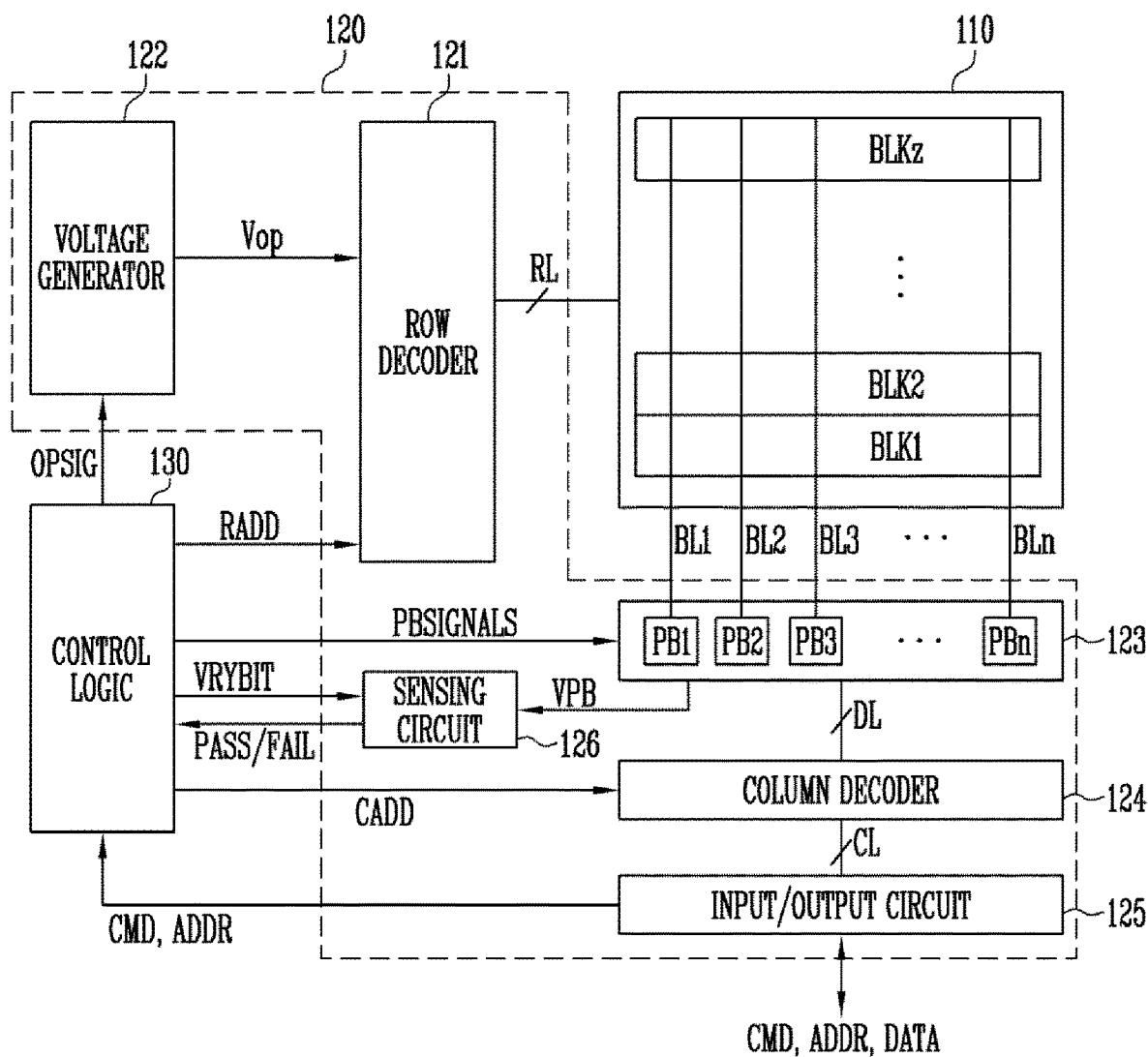
FIG. 2 is a diagram illustrating a memory device in accordance with an embodiment of the present disclosure.

FIG. 2 is a diagram illustrating a memory device in accordance with an embodiment of the present disclosure, for example, the memory device 100 of FIG. 1.

Referring to FIG. 2, the memory device 100 may include a memory cell array 110, a peripheral circuit 120, and control logic 130.

The memory cell array 110 may include a plurality of memory blocks, for example, memory blocks BLK1 to BLKz. The plurality of memory blocks BLK1 to BLKz are coupled to a row decoder 121 through row lines RL. The plurality of memory blocks BLK1 to BLKz may be coupled to a page buffer group 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line may be defined as one page. Hence, each memory block may include a plurality of pages.

The row lines RL may include at least one source select line, a plurality of word lines, and at least one drain select line.

Each of the memory cells in the memory cell array 110 may be formed of a single level cell (SLC) capable of storing a bit of data, a multi-level cell (MLC) capable of storing two bits of data, a triple-level cell (TLC) capable of storing three bits of data, or a quad-level cell (QLC) capable of storing four bits of data.

The peripheral circuit 120 may perform a program operation, a read operation, or an erase operation on a selected region of the memory cell array 110 under control of the control logic 130. The peripheral circuit 120 may drive the memory cell array 110. For example, the peripheral circuit 120 may apply various operating voltages to the row liens RL and the bit lines BL1 to BLn or discharge the applied voltages, under control of the control logic 130.

The peripheral circuit 120 may include the row decoder 121, a voltage generator 122, the page buffer group 123, a column decoder 124, and an input and output (input/output) circuit 125.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under control of the control logic 130. The row decoder 121 may receive a row address RADD from the control logic 130.

The row decoder 121 may decode the row address RADD. The row decoder 121 may select at least one memory block of the memory blocks BLK1 to BLKz in response to the decoded address. The row decoder 121 may select at least one word line WL of the selected memory block in response to the decoded address so that voltages Vop generated from the voltage generator 122 are applied to the at least one word line WL.

For example, during a program operation, the row decoder 121 may apply a program voltage to a selected word line and apply a program pass voltage having a level less than that of the program voltage to unselected word lines. During a program verify operation, the row decoder 121 may apply a verify voltage to a selected word line and apply a verify pass voltage greater than the verify voltage to unselected word lines. During a read operation, the row decoder 121 may apply a read voltage to a selected word line and apply a read pass voltage greater than the read voltage to unselected word lines.

In an embodiment, an erase operation of the memory device 100 may be performed on a memory block basis. During an erase operation, the row decoder 121 may select one memory block in response to a decoded address. During the erase operation, the row decoder 121 may apply a ground voltage to word lines coupled to the selected memory block.

The voltage generator 122 may operate under control of the control logic 130. The voltage generator 122 may generate a plurality of voltages Vop using an external supply voltage supplied to the memory device 100. In detail, the voltage generator 122 may generate various operating voltages Vop to be used for a program operation, a read operation, and an erase operation in response to an operating signal OPSIG from the control logic 130. For example, the voltage generator 122 may generate a program voltage, a verify voltage, a pass voltage, a read voltage, an erase voltage, and so forth under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using an external supply voltage or an internal supply voltage.

For example, the voltage generator 122 may include a plurality of pumping capacitors for receiving the internal supply voltage and generate a plurality of voltages by selectively activating the plurality of pumping capacitors under control of the control logic 130.

The generated voltages may be supplied to the memory cell array 110 by the row decoder 121.

The page buffer group 123 may include a plurality of page buffers, for example, first to n-th page buffers PB1 to PBn. The first to n-th page buffers PB1 to PBn are coupled to the memory cell array 110 through the first to n-th bit lines BL1 to BLn, respectively. The first to n-th page buffers PB1 to PBn may operate under control of the control logic 130. In detail, the first to n-th page buffers PB1 to PBn may operate in response to page buffer control signals PBSIGNALS from the control logic 130. For instance, the first to n-th page buffers PB1 to PBn may temporarily store data received through the first to n-th bit lines BL1 to BLn, or sense voltages or currents of the first to n-th bit lines BL1 to BLn during a read operation or a verify operation.

In detail, during a program operation, the first to n-th page buffers PB1 to PBn may transmit data DATA received through the input/output circuit 125 to selected memory cells through the first to n-th bit lines BL1 to BLn when a program pulse is applied to a selected word line. The memory cells in the selected page are programmed based on the transmitted data DATA. Memory cells coupled to a bit line to which a program allowable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to n-th page buffers PB1 to PBn may read page data from selected memory cells through the first to n-th bit lines BL1 to BLn.

During a read operation, the first to n-th page buffers PB1 to PBn may read data DATA from memory cells of a selected page through the first to n-th bit lines BL1 to BLn, and output the read data DATA to the data input/output circuit 125 under control of the column decoder 124.

During an erase operation, the first to n-th page buffers PB1 to PBn may float the first to n-th bit lines BL1 to BLn.

The column decoder 124 may transmit data between the input/output circuit 125 and the page buffer group 123 in response to a column address CADD from the control logic 130. For example, the column decoder 124 may exchange data with the first to n-th page buffers PB1 to PBn through data lines DL or exchange data with the input/output circuit 125 through column lines CL.

The input/output circuit 125 may transmit, to the control logic 130, a command CMD or an address ADDR received from the memory controller 200 described with reference to FIG. 1, or may exchange data DATA with the column decoder 124.

During a read operation or a verify operation, the sensing circuit 126 may generate a reference current in response to an allowable bit signal VRYBIT from the control logic 130, and may compare a sensing voltage VPB received from the page buffer group 123 with a reference voltage generated by the reference current and output a pass signal PASS or a fail signal FAIL to the control logic 130.

The control logic 130 may output an operating signal OPSIG, a row address RADD, page buffer control signals PBSIGNALS, and an allowable bit signal VRYBIT in response to a command CMD and an address ADD, and thus control the peripheral circuit 120. In addition, the control logic 130 may determine whether a target memory cell has passed or failed a verify operation in response to a pass or fail signal PASS or FAIL.

Figure 3:
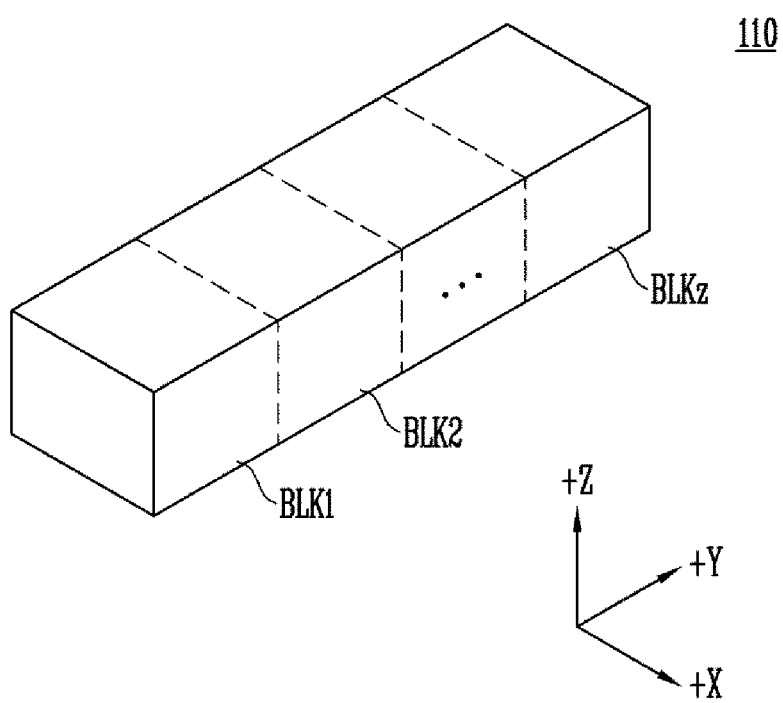
FIG. 3 is a diagram illustrating a memory cell array in accordance with an embodiment of the present disclosure.

FIG. 3 is a diagram illustrating a memory cell array in accordance with an embodiment of the present disclosure, for example, the memory cell array 110 of FIG. 2.

Referring to FIG. 3, the memory cell array 110 may include a plurality of memory blocks BLK1 to BLKz. Each memory block may have a three-dimensional (3D) structure. Each memory block may include a plurality of memory cells stacked on a substrate. The memory cells are arranged in a +X direction, a +Y direction, and a +Z direction. The structure of each memory block will be described in more detail with reference to FIGS. 4 and 5.

Figure 4:
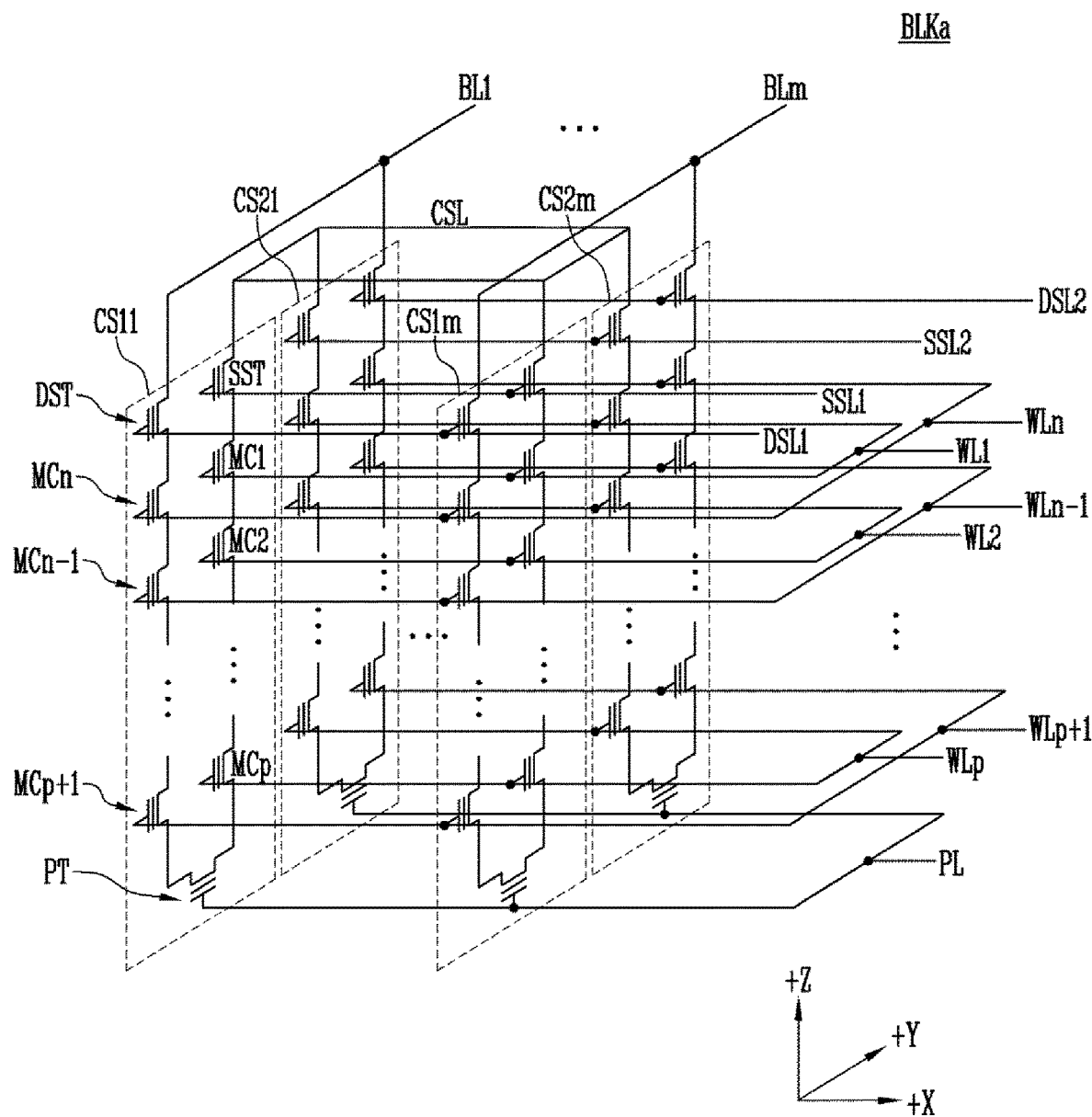
FIG. 4 is a circuit diagram illustrating a memory block in accordance with an embodiment of the present disclosure.

FIG. 4 is a circuit diagram illustrating a memory block, BLKa, which may be any one of memory blocks BLK1 to BLKz, in accordance with an embodiment of the present disclosure.

Referring to FIG. 4, the memory block BLKa may include a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings may be arranged in a row direction (i.e., the +X direction). In FIG. 4, two cell strings are illustrated as being arranged in a column direction (i.e., the +Y direction). However, this illustration is made for convenience of description, and it will be understood that three or more cell strings may be arranged in the column direction.

Each of the plurality of cell strings CS11 to CS1m and CS21 to CS2m may include at least one source select transistor SST, first to n-th memory cells MC1 to MCn, a pipe transistor PT, and at least one drain select transistor DST.

The select transistors SST and DST and the memory cells MC1 to MCn may have structures similar to each other. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 4, source select transistors of the cell strings CS11 to CS1m in a first row are coupled to a first source select line SSL1. Source select transistors of the cell strings CS21 to CS2m in a second row are coupled to a second source select line SSL2.

In an embodiment, the source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are successively arranged in a −Z direction and are coupled in series between the source select transistor SST and the pipe transistor PT. The (p+1)-th to n-th memory cells MCp+1 to MCn are successively arranged in the +Z direction and are coupled in series between the pipe transistor PT and the drain select transistor DST. The first to p-th memory cells MC1 to MCp and the (p+1)-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 4, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. Cell strings arranged in the direction of a single row may be selected by selecting any one of the drain select lines DSL1 and DSL2. One page may be selected from among the selected cell strings by selecting any one of the word lines WL1 to WLn.

In an embodiment, even bit lines and odd bit lines may be provided in lieu of the first to m-th bit lines BL1 to BLm. Even numbered cell strings, of the cell strings CS11 to CS1m or CS21 to CS2m, arranged in the row direction may be coupled to respective even bit lines. Odd numbered cell strings, of the cell strings CS11 to CS1m or CS21 to CS2m, arranged in the row direction may be coupled to respective odd bit lines.

In an embodiment, at least one of the first to n-th memory cells MC1 to MCn may be used as a dummy memory cell. For example, the dummy memory cell(s) may be provided to reduce an electric field between the source select transistor SST and the memory cells MC1 to MCp. Alternatively, the dummy memory cell(s) may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is decreased, the size of the memory block BLKa may be decreased, but the reliability in operation of the memory block BLKa may be decreased.

To efficiently control the dummy memory cell(s), each may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling a voltage to be applied to the dummy word lines coupled to the respective dummy memory cells.

Figure 5:
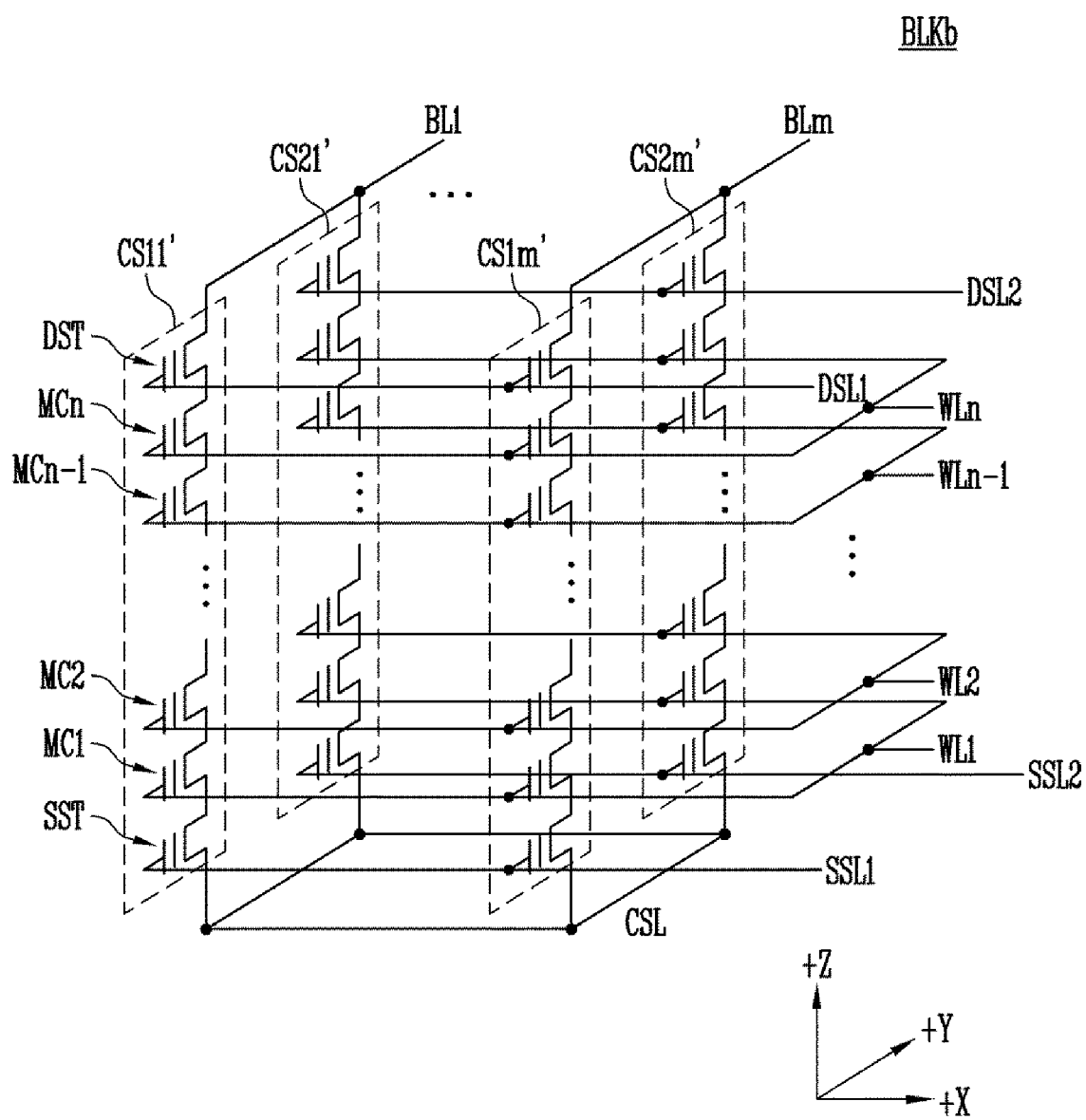
FIG. 5 is a circuit diagram illustrating a memory block in accordance with an embodiment of the present disclosure.

FIG. 5 is a circuit diagram illustrating a memory block, BLKb, which may be any of the memory blocks BLK1 to BLKz, in accordance with an embodiment of the present disclosure.

Referring to FIG. 5, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequently, the memory block BLKb of FIG. 5 may have an equivalent circuit similar to that of the memory block BLKa of FIG. 4 except that a pipe transistor PT is excluded from each cell string.

In an embodiment, even bit lines and odd bit lines may be provided in lieu of the first to m-th bit lines BL1 to BLm. Among the cell strings CS11' to CS1m' or CS21' to CS2m', even numbered cell strings arranged in the row direction may be coupled to the respective even bit lines, and odd numbered cell strings arranged in the row direction may be coupled to the respective odd bit lines.

In an embodiment, at least one of the first to n-th memory cells MC1 to MCn may be used as a dummy memory cell. For example, the dummy memory cell(s) may be provided to reduce an electric field between the source select transistor SST and the memory cells MC1 to MCn. Alternatively, the dummy memory cell(s) may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is decreased, the size of the memory block BLKb may be decreased, but the reliability in operation of the memory block BLKb may be decreased.

To efficiently control the dummy memory cell(s), each may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling a voltage to be applied to the dummy word lines coupled to the respective dummy memory cells.

Figure 6:
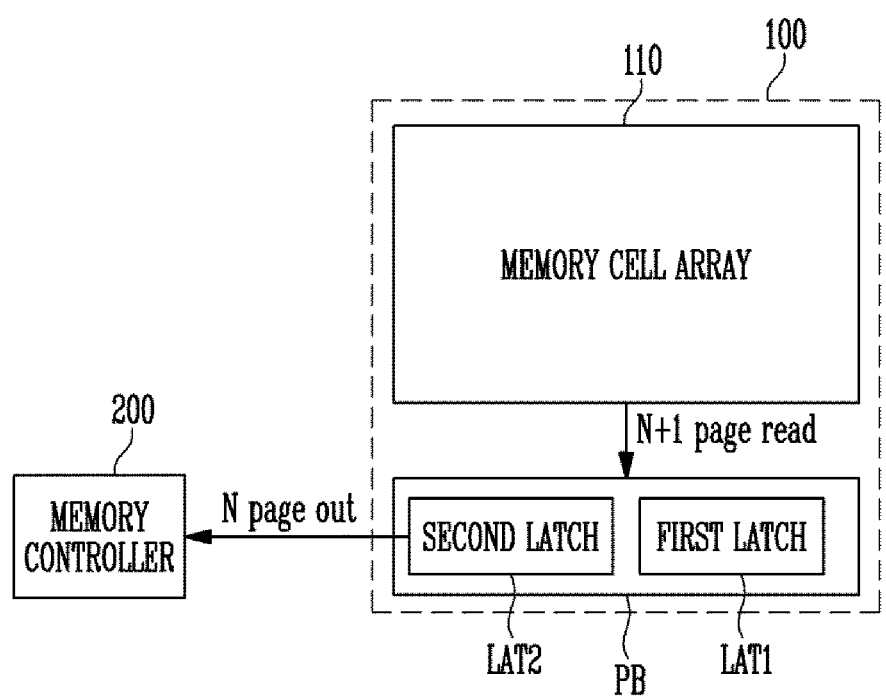
FIG. 6 is a diagram illustrating a cache read operation in accordance with an embodiment of the present disclosure.

FIG. 6 is a diagram illustrating a cache read operation in accordance with an embodiment of the present disclosure.

Referring to FIG. 6, the memory device 100 may include a memory cell array 100 and a page buffer PB. The diagram of FIG. 6 is for clarity and ease of explanation; the memory device 100 may include other various components as well as the memory cell array 110 and the page buffer PB.

The cache read operation for enhancing read performance may be an operation of reading data of one page in the memory cell array 110 and storing the data in the page buffer PB, and then reading data of another page of the memory cell array 110 to the page buffer while the data of the one page that is stored in the page buffer PB is outputted to the memory controller 200.

In FIG. 6, it is assumed that the memory controller 200 provides a cache read command for successive two pages (an N-th page and an N+1-th page) to the memory device 100.

The page buffer PB may include a first latch LAT1 and a second latch LAT2. The first latch LAT1 may be a main latch, and the second latch LAT2 may be a cache latch. Data read from the memory cell array 100 may be stored in the first latch LATCH1 that is the main latch. Data stored in the main latch may be transmitted to the second latch LAT2.

First, a read operation may be performed on the N-th page. If the read operation is performed, data of the N-th page may be stored in the first latch LAT1. In an embodiment, data stored in the first latch LAT1 may be transmitted to the second latch LAT2.

If data is stored in the second latch LAT2, the stored data may be outputted in response to a request of the memory controller 200. The data of the N-th page that is stored in the second latch LAT2 may be provided to the memory controller 200 (refer to "N page out").

While the data of the N-th page that is stored in the second latch LAT2 is provided to the memory controller 200, data of the (N+1)-th page of the memory cell array 110 may be read and stored in the first latch LAT1 (i.e., "N+1 page read").

Although the single page buffer PB has been illustrated in FIG. 6, this is only for convenience. In various embodiments, a page buffer PB may be provided for each of the bit lines coupled to the memory cell array.

As the cache read operation is performed, the read performance may be enhanced. However, since an operation of reading a region of the memory cell array 110 and an operation of outputting data of the page buffer PB are simultaneously performed in the cache read operation, power consumption may be increased compared to that of the normal read operation.

Figure 7:
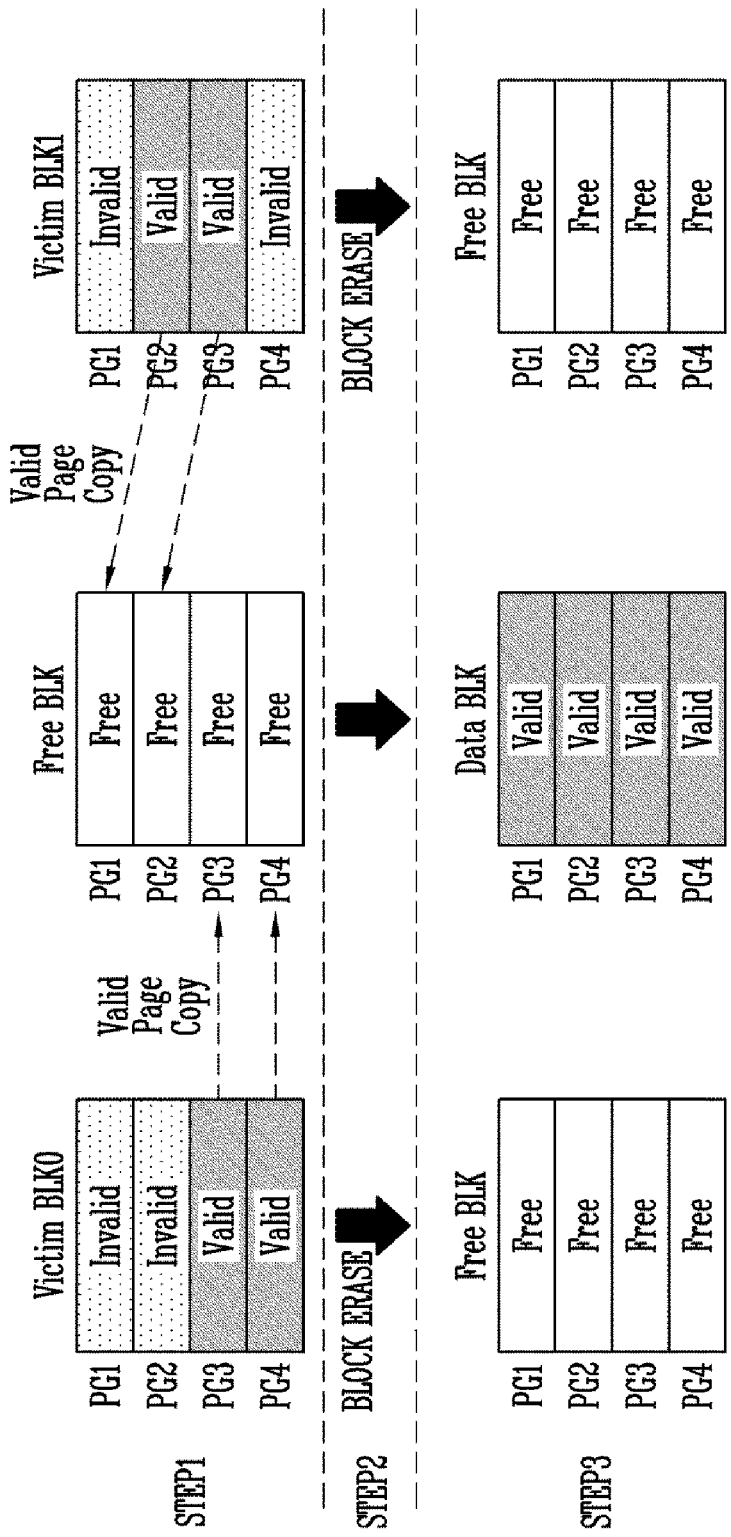
FIG. 7 is a diagram illustrating a garbage collection operation of a storage device in accordance with an embodiment of the present disclosure.

FIG. 7 is a diagram illustrating a garbage collection operation of a storage device in accordance with an embodiment of the present disclosure.

The garbage collection operation may be an operation to be performed to secure a free block. The garbage collection operation may be an operation of copying valid data in victim blocks to free blocks, and erasing the victim blocks.

FIG. 7 illustrates the case where each memory block includes four pages including first to fourth pages PG1 to PG4; however, embodiments of the present disclosure are not limited thereto.

Referring to FIG. 7, the garbage collection operation may be performed through steps STEP1 to STEP3. For example, the garbage collection operation may be performed by the controller 200 of FIG. 6.

At step STEP1, block 0 and block 1 are selected to victim blocks, i.e., Victim BLK0 and Victim BLK1, respectively. A method of selecting a victim block may be performed based on various criteria. For example, a memory block in which the amount of stored valid data therein is a predetermined amount or level or less may be selected as a victim block. Alternatively, a victim block may be selected using a ratio between stored valid data and invalid data. In block 0, a first page PG1 and a second page PG2 may be invalid pages in which invalid data is stored, and a third page PG3 and a fourth page PG4 may be valid pages in which valid data is stored. In another example, as shown in block 1, a first page PG1 and a fourth page PG4 of may be invalid pages in which invalid data is stored, and a second page PG2 and a third page PG3 may be valid pages in which valid data is stored. The memory controller 200 may copy, to free blocks (i.e., target blocks), data stored in the valid pages of block 0 BLK0 and block 1 BLK1. The copying operation may be performed through a process of reading the corresponding valid pages and programming the read data to free blocks.

At step STEP2, the memory controller 200 may perform an erase operation on block 0 BLK0 and block 1 BLK1. During the erase operation of the memory controller 200, all data stored in block 0 BLK0 and block 1 BLK1 may be erased.

At step STEP3, block 0 BLK0 and block 1 BLK1 may become free blocks. The target blocks that were free blocks at step STEP1 may become data blocks including valid data. Therefore, the number of free blocks that has been one before the garbage collection operation is performed may be increased to two by the garbage collection operation.

Figures 8, 9:
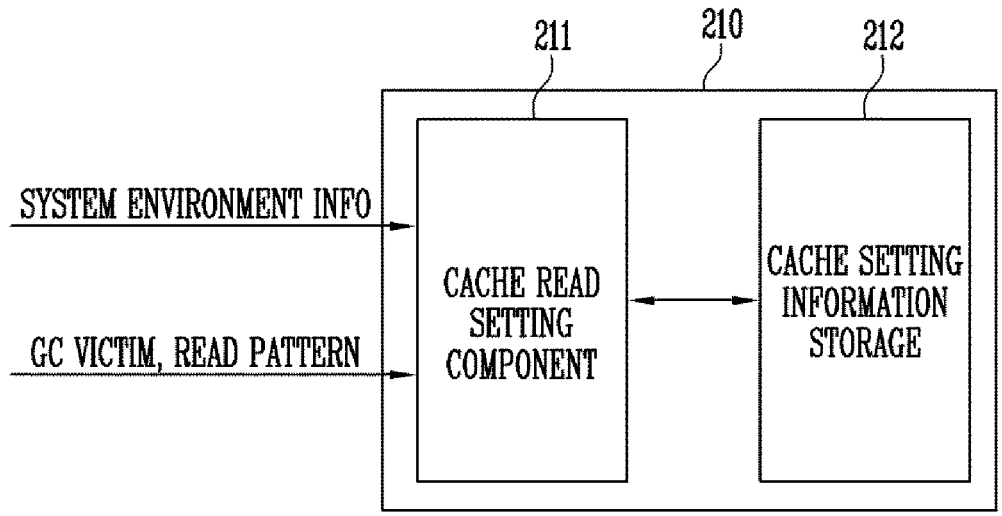
FIG. 8 is a diagram illustrating a cache read control component in accordance with an embodiment of the present disclosure.
FIG. 9 is a diagram illustrating an example of cache setting information stored in a cache setting information storage in accordance with an embodiment of the present disclosure.

FIG. 8 is a diagram illustrating a cache read control component in accordance with an embodiment of the present disclosure, for example, the cache read controller 210 of FIG. 1.

Referring to FIG. 8, the cache read controller 210 may include a cache read setting component 211 and a cache setting information storage 212.

If power is supplied to the memory controller 200, the memory controller 200 may execute the firmware FW. The firmware FW may load system environment information SYSTEM ENVIRONMENT INFO which is information about system environment of the memory controller 200. In an embodiment, the system environment information may include information about the number of memory devices 100 to be controlled by the memory controller 200. For example, the storage device 50 described with reference to FIG. 1 may include a plurality of memory devices 100. The storage device 50 may include an octa die package (ODP) formed by stacking eight chips of the memory devices 100. Alternatively, the storage device 50 may include a quad die package (QDP) formed by stacking four chips of the memory devices 100.

The cache read setting component 211 may set cache setting information of the memory devices 100 based on the system environment information. For example, the cache read setting component 211 may determine whether the number of memory devices 100 exceeds a first threshold value. If it is determined that the number of memory devices 100 exceeds the first threshold value, the cache read setting component 211 may set the cache setting information of the memory devices 100 to a disabled state. Alternatively, if the number of memory devices 100 is equal to or less than the first threshold value, the cache read setting component 211 may set the cache setting information of the memory devices 100 to an enabled state. In an embodiment, the first threshold value may be 4.

In an embodiment, the cache read setting component 211 may set the cache setting information of the memory devices 100 based on victim block information GC VICTIM of the garbage collection operation. The victim block information GC VICTIM may include information about a memory device 100 including a victim block, and information about the number of segments of invalid data in the victim block. In an embodiment, the number of segments of the invalid data may correspond to the number of pages in which the invalid data is stored.

The cache read setting component 211 may set the cache setting information of the memory device 100 including the victim block of the garbage collection operation to the disabled state. In various embodiments, based on whether the number of invalid data segments in victim blocks exceeds a second threshold value, the cache read setting component 211 may set the cache setting information of the memory devices 100. For example, the cache read setting component 211 may determine whether the number of segments of the invalid data exceeds the second threshold value. If it is determined that the number of segments of the invalid data exceeds the second threshold value, the cache read setting component 211 may set the cache setting information of the memory devices 100 to the disabled state. Alternatively, if the number of segments of the invalid data is equal to or less than the second threshold value, the cache read setting component 211 may set the cache setting information of the memory devices 100 to the enabled state.

The cache setting information storage 212 may store the cache setting information of the memory devices 100.

During a read operation on a memory device 100 of which the cache setting information indicates the enabled state, the memory controller 200 may perform the read operation as a cache read operation. For this, the memory controller 200 may provide a cache read command to the memory device 100.

Alternatively, during a read operation on a memory device 100 of which the cache setting information indicates the disabled state, the memory controller 200 may perform the read operation as a normal read operation. For this, the memory controller 200 may provide a normal read command to the memory device 100.

FIG. 9 is a diagram illustrating an example of cache setting information stored in a cache setting information storage, for example, the cache setting information storage 212 of FIG. 8, in accordance with an embodiment of the present disclosure.

Referring to FIG. 9, the cache setting information may be information about whether a cache read operation of each memory device or each chip of memory device CHIP has been performed.

For instance, the cache setting information CACHE READ of a first memory device CHIP1, a third memory device CHIP3, a fourth memory device CHIP4, and a k-th memory device CHIPk may indicate an enabled state ENABLED. The cache setting information of a second memory device CHIP2, a fifth memory device CHIP5, and a sixth memory device CHIP6 may indicate a disabled state DISABLED.

A read operation on the memory devices of which the cache setting information indicates the enabled state may be performed as a cache read operation. A read operation on the memory devices of which the cache setting information indicates the disabled state may be performed as a normal read operation. When the memory controller performs a read operation on a plurality of memory devices, each of the memory devices may receive a read command determined depending on corresponding cache setting information.

Figure 10:
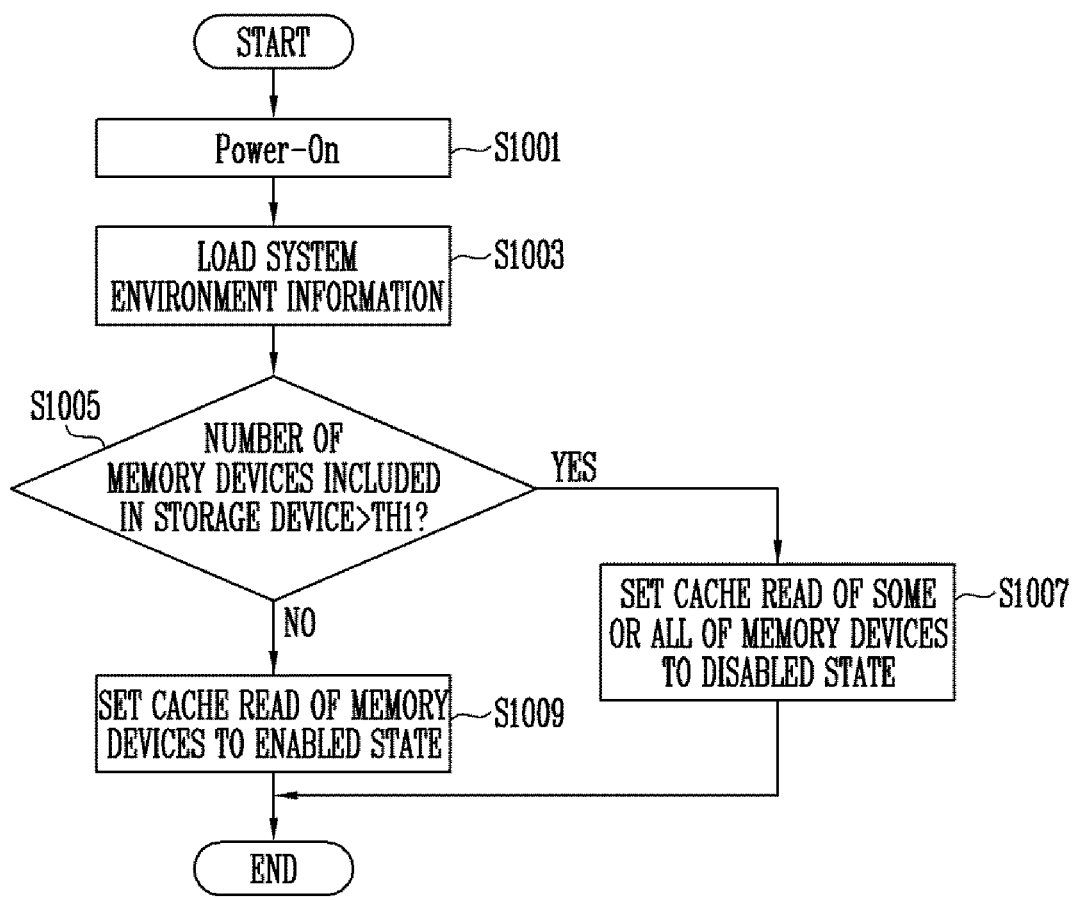
FIG. 10 is a flowchart illustrating a method of operating a storage device in accordance with an embodiment of the present disclosure.

FIG. 10 is a flowchart illustrating a method of operating a memory controller in accordance with an embodiment of the present disclosure. The operation of FIG. 10 may be performed by the memory controller 200 of FIGS. 1 and 6.

Referring to FIG. 10, at step S1001, the memory controller is supplied with power. If the power is supplied, the firmware of the memory controller may be loaded.

At step S1003, the memory controller may load the system environment information. The system environment information may include information about the number of memory devices to be controlled by the memory controller.

At step S1005, the memory controller may determine whether the number of memory devices included in the storage device exceeds a first threshold value. If it is determined that the number of memory devices exceeds the first threshold value, the process proceeds to step S1007; otherwise, the process proceeds to step S1009. In an embodiment, the first threshold value may be 4.

At step S1007, the memory controller may set cache setting information of memory devices to the disabled state.

At step S1009, the memory controller may set cache setting information of memory devices to the enabled state.

Figure 11:
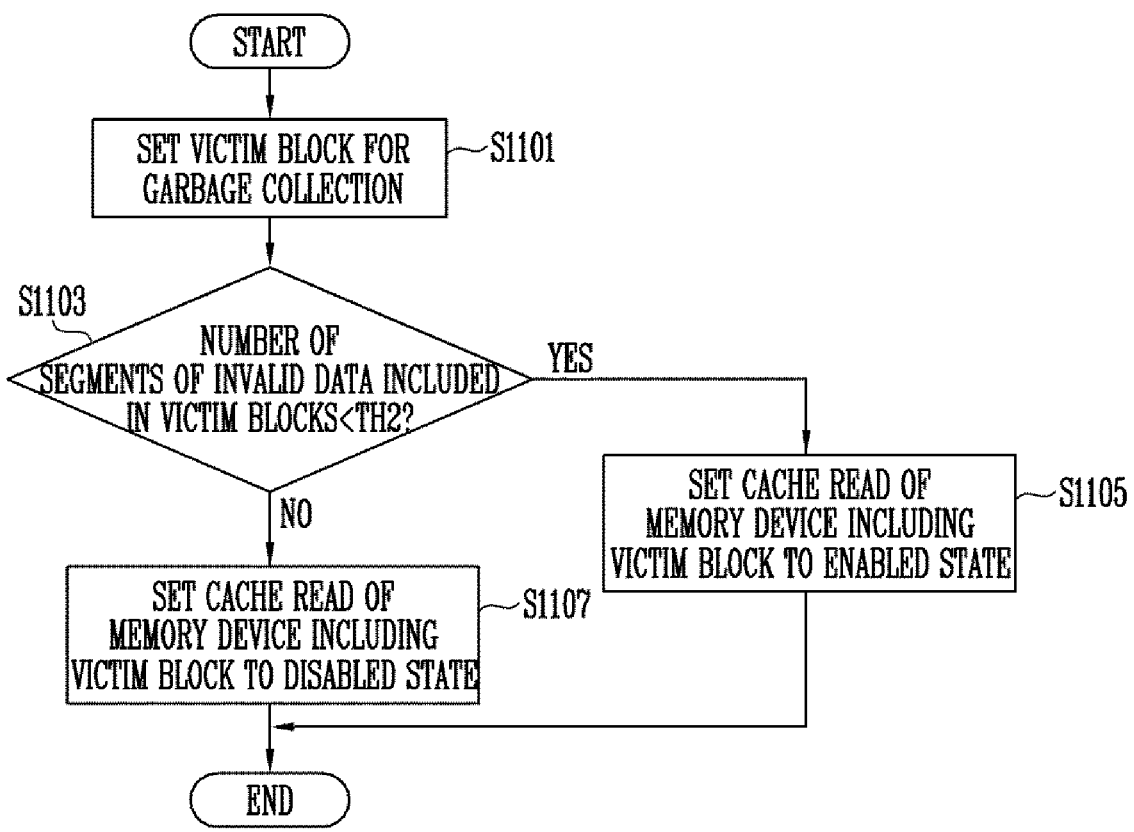
FIG. 11 is a flowchart illustrating a method of operating a storage device in accordance with an embodiment of the present disclosure.

FIG. 11 is a flowchart illustrating a method of operating a memory controller in accordance with an embodiment of the present disclosure. The operation of FIG. 11 may be performed by the memory controller 200 of FIGS. 1 and 6.

Referring to FIG. 11, at step S1101, the memory controller may set a victim block for a garbage collection operation.

At step S1103, the memory controller may determine whether the number of segments of invalid data included in the victim block exceeds a second threshold value, which may be preset. The number of segments of the invalid data may correspond to the number of pages in which the invalid data is stored. If it is determined that the number of segments of the invalid data in the victim exceeds the second threshold value, the process proceeds to step S1107; otherwise, the process proceeds to step S1105.

At step S1105, the memory controller may set cache setting information of memory devices to the enabled state.

At step S1107, the memory controller may set cache setting information of memory devices to the disabled state.

Figure 12:
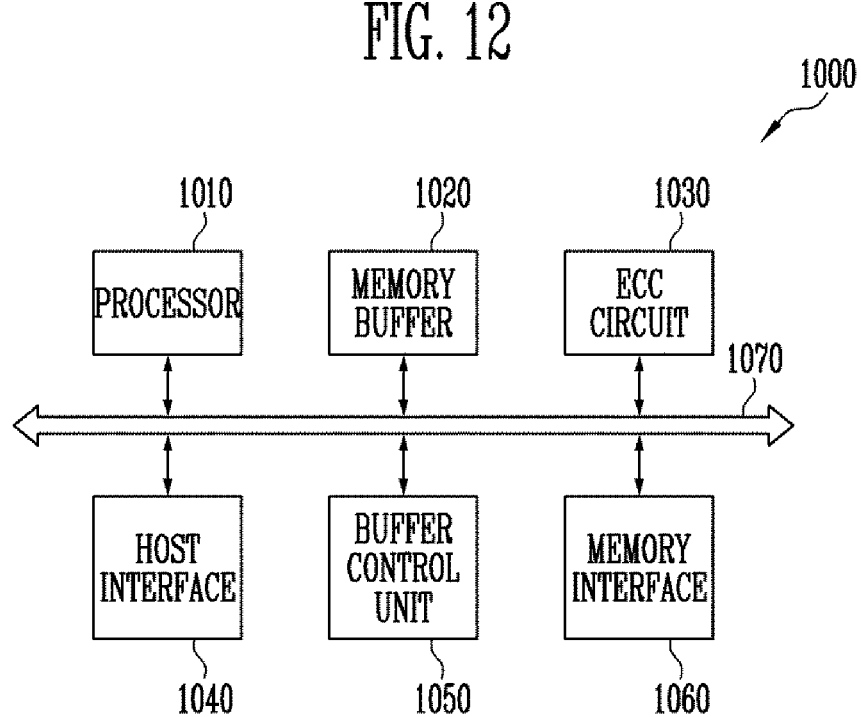
FIG. 12 is a diagram illustrating a memory controller in accordance with an embodiment of the present disclosure.

FIG. 12 is a diagram illustrating a memory controller 1000 in accordance with an embodiment of the present disclosure. The memory controller 1000 may be the memory controller 200 of FIG. 1.

The memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

Referring to FIG. 12, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a communication channel between the components of the memory controller 1000.

The processor 1010 may control the overall operation of the memory controller 1000 and perform a logical operation. The processor 1010 may communicate with the external host through the host interface 1040, and communicate with the memory device, for example, the memory device 100 of FIG. 1, through the memory interface 1060. In addition, the processor 1010 may communicate with the memory buffer 1020 through the buffer control circuit 1050. The processor 1010 may control the operation of the storage device, for example, the storage device 50 of FIG. 1, using the memory buffer 1020 as an operation memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. An address mapping method using the FTL may be modified in various ways based on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device 100 to be stored, and may be programmed to the memory cell array.

During a read operation, the processor 1010 may derandomize data received from the memory device 100. For example, the processor 1010 may use a derandomizing seed to derandomize data received from the memory device 100. Derandomized data may be output to the host.

In an embodiment, the processor 1010 may drive software or firmware to perform the randomizing operation or the derandomizing operation.

The memory buffer 1020 may be used as an operation memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static random access memory (RAM) (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device 100 through the memory interface 1060. The ECC circuit 1030 may perform an ECC decoding operation on data received from the memory device 100 through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM).

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device 100 through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device 100 through the memory interface 1060.

For example, the bus 1070 of the memory controller 1000 may include a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 13:
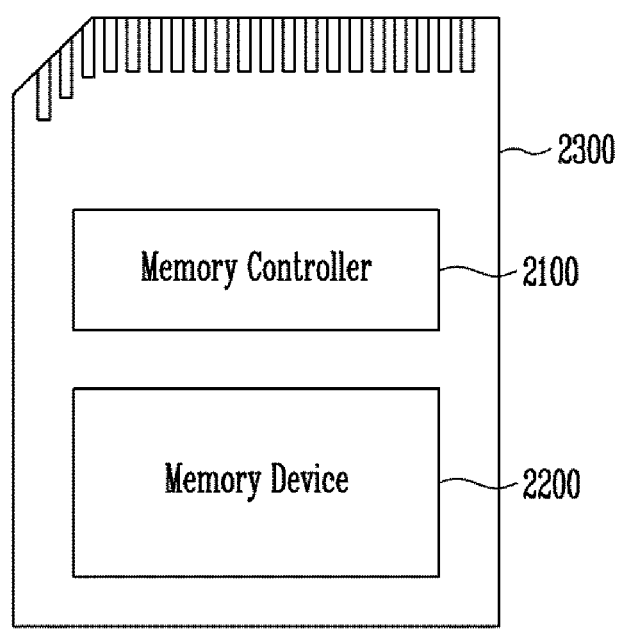
FIG. 13 is a block diagram illustrating a memory card system to which the storage device in accordance with an embodiment of the present disclosure is applied.

FIG. 13 is a block diagram illustrating a memory card system 2000 to which a storage device in accordance with an embodiment of the present disclosure is applied.

Referring FIG. 13, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and a host (not shown). The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processor, a host interface, and a memory interface, and an error correction code (ECC) circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and non-volatile memory express (NVMe) protocols. In an embodiment, the connector 2300 may be defined by at least one of the above-described communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card such as a personal computer memory card international association (PCM-CIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 14:
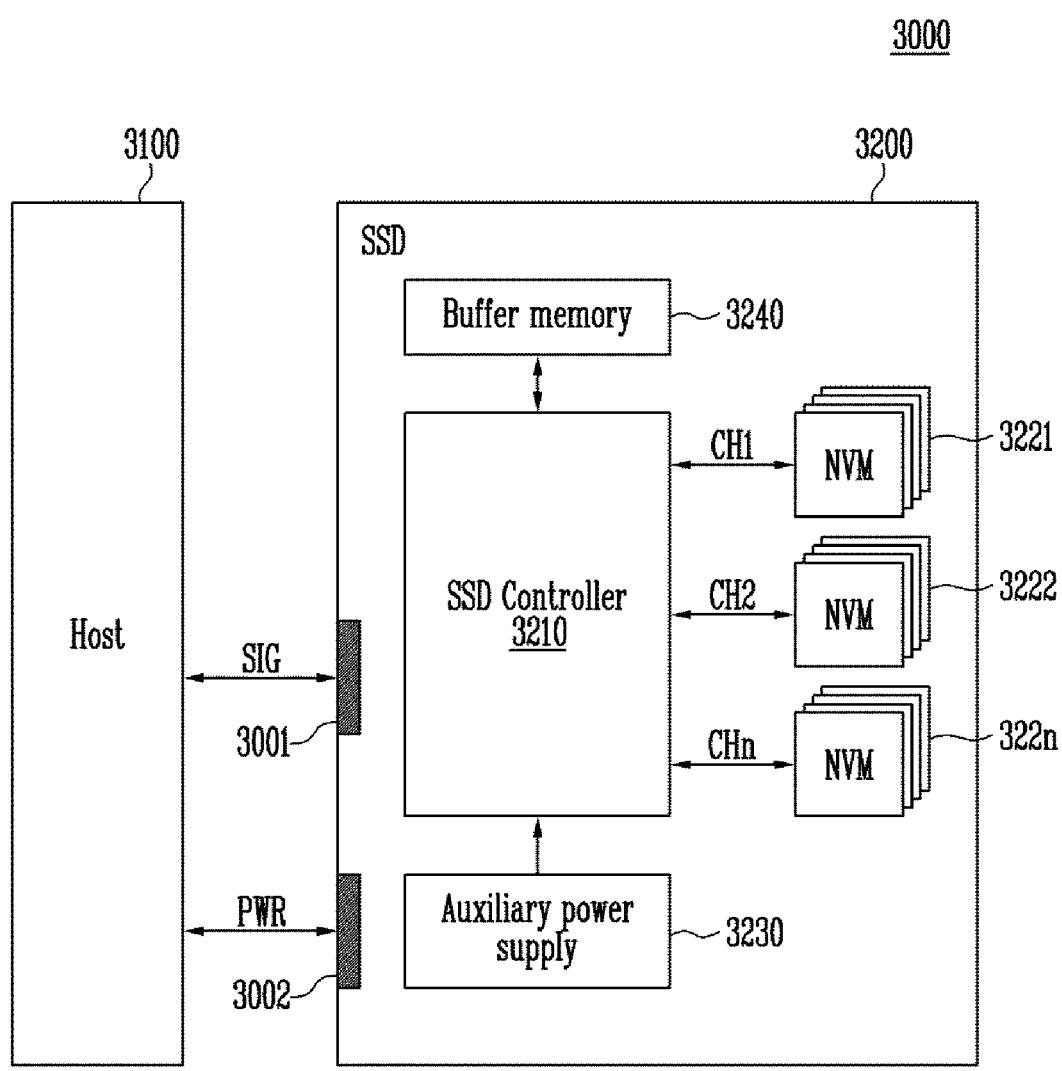
FIG. 14 is a block diagram illustrating a solid state drive (SSD) system to which the storage device in accordance with an embodiment of the present disclosure is applied.

FIG. 14 is a block diagram illustrating a solid state drive (SSD) system 3000 to which the storage device in accordance with an embodiment of the present disclosure is applied.

Referring to FIG. 14, the SSD system 3000 may include a host 3100 and an SSD 3200. The SSD 3200 may exchange signals SIG with the host 3100 through a signal connector 3001 and may be provided with power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when power from the host 3100 is not smoothly supplied. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 may function as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as a dynamic RAM (DRAM), a synchronous DRAM (SDRAM), a double data rate (DDR) SDRAM, a low power double data rate (LPDDR) SDRAM, and GRAM or nonvolatile memories such as a ferroelectric RAM (FRAM), a resistive RAM (ReRAM), a spin transfer torque magnetic random access memory (STT-MRAM), and a phase-change RAM (PRAM).

Figure 15:
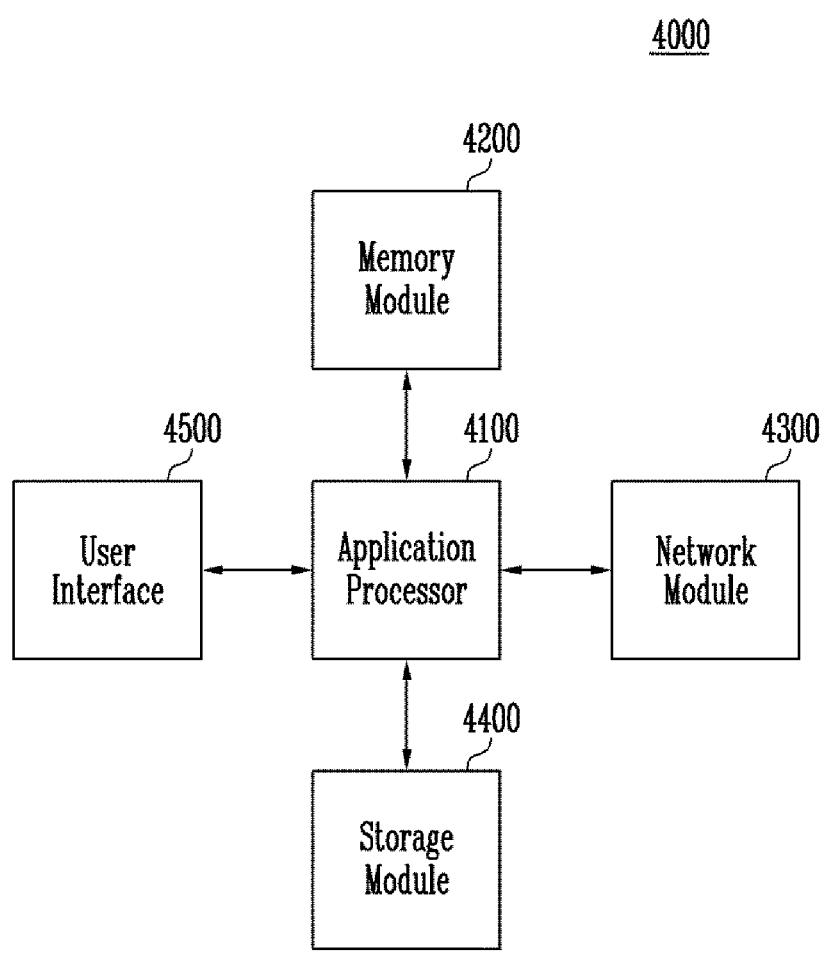
FIG. 15 is a block diagram illustrating a user system to which the storage device in accordance with an embodiment of the present disclosure is applied.

FIG. 15 is a block diagram illustrating a user system 4000 to which the storage device in accordance with an embodiment of the present disclosure is applied.

Referring to FIG. 15, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile random access memories (RAMs) such as a dynamic RAM (DRAM), a synchronous DRAM (SDRAM), a double data rate (DDR) SDRAM, DDR2 SDRAM, DDR3 SDRAM, a low power double data rate (LPDDR) SDARM, and LPDDR3 SDRAM, or nonvolatile RAMs such as a phase-change RAM (PRAM), a resistive RAM (ReRAM), a magneto-resistive RAM (MRAM), and a ferroelectric RAM (FRAM). In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 400.

In an embodiment, the storage module 4400 may include a plurality of nonvolatile memory devices, and each of the plurality of nonvolatile memory devices may be operated in the same manner as that of the memory device 100, described above with reference to FIGS. 2 and 5. The storage module 4400 may be operated in the same manner as that of the storage device 50, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a motor.

As described above, various embodiments of the present disclosure provide a storage device configured to perform a cache read operation by each memory device, and a method of operating the storage device.

While various embodiments of the present disclosure have been described and illustrated, those skilled in the art will appreciate that various modifications, additions, and substitutions are possible. Therefore, the scope of the present disclosure is defined by the appended claims and their equivalents rather than by the description preceding them.

In the above-discussed embodiments, steps may be selectively performed or skipped. In addition, the steps in each embodiment may be not always performed in regular order. Furthermore, the embodiments disclosed in the present specification and the drawings aim to help those skilled in this art more clearly understand the present disclosure rather than to limit the bounds of the present disclosure. In other words, one skilled in the art to which the present disclosure belongs will be able to easily understand that various modifications are possible in light of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A storage device comprising:
   a plurality of memory devices, each including a plurality of memory blocks; and
   a memory controller configured to control the plurality of memory devices such that one of a cache read operation and a normal read operation on a select one of the plurality of memory devices is performed based on cache setting information set indicating whether the cache read operation is to be performed.

2. The storage device according to claim 1, wherein the memory controller comprises
   a cache read setting component configured to set the cache setting information.

3. The storage device according to claim 2, wherein, when power is applied to the storage device, the cache read setting component obtains system environment information including information about a number of the plurality of memory devices, and sets the cache setting information based on the system environment information.

4. The storage device according to claim 3, wherein, when the number of the plurality of memory devices exceeds a first threshold value, the cache read controller sets the cache setting information of the plurality of memory devices to a disabled state.

5. The storage device according to claim 4, wherein the memory controller performs the normal read operation on a memory device, among the plurality of memory devices, for which the cache setting information indicates the disabled state.

6. The storage device according to claim 3, wherein, when the number of the plurality of memory devices is equal to or less than the first threshold value, the cache read controller sets the cache setting information of the plurality of memory devices to an enabled state.

7. The storage device according to claim 6, wherein the first threshold value is 4.

8. The storage device according to claim 6, wherein the memory controller performs the cache read operation on a memory device, among the plurality of memory devices, for which the cache setting information indicates the enabled state.

9. The storage device according to claim 2, wherein, during a garbage collection operation on the plurality of memory blocks, the cache read setting component obtains information about a victim block, among the plurality of memory blocks, and sets the cache setting information based on the information about the victim block.

10. The storage device according to claim 9, wherein the information about the victim block includes information of the memory device that includes the victim block, and information about a number of segments of invalid data included in the victim block.

11. The storage device according to claim 10, wherein the number of segments of the invalid data corresponds to a number of pages in which the invalid data is stored.

12. The storage device according to claim 10, wherein, when the number of segments of the invalid data exceeds a second threshold value, the cache read setting component sets the cache setting information of the memory device that includes the victim block to a disabled state.

13. The storage device according to claim 12, wherein the memory controller performs normal read operation on the memory device that includes the victim block and for which the cache setting information indicates the disabled state.

14. The storage device according to claim 10, wherein, when the number of segments of the invalid data is equal to or less than the second threshold value, the cache read setting component sets the cache setting information of the memory device that includes the victim block to a enabled state.

15. The storage device according to claim 14, wherein the memory controller performs the cache read operation on the memory device that includes the victim block and for which the cache setting information indicates the enabled state.

16. The storage device according to claim 9, wherein the cache read setting component sets the cache setting information of the memory device that includes the victim block, among the plurality of memory devices, to an enabled state.

17. The storage device according to claim 2, wherein the cache read setting component sets the cache setting information based on a pattern of a read request received from a host.

* * * * *